United States Patent [19]

Schneider et al.

[11] 4,092,853
[45] June 6, 1978

[54] TESTING ROTARY MOVEMENT-ELECTRICAL SIGNAL TRANSDUCER SYSTEM, PARTICULARLY FOR VEHICLE WHEEL ANTI-BLOCK TRANSDUCER SYSTEMS

[75] Inventors: Erich Schneider, Kirchheim; Eberhard Schnaibel, Hemmingen; Helmut Fleischer, Schwieberdingen, all of Germany

[73] Assignee: Robert Bosch GmbH, Stuttgart, Germany

[21] Appl. No.: 733,125

[22] Filed: Oct. 18, 1976

[30] Foreign Application Priority Data

Oct. 25, 1975  Germany .............................. 2547869

[51] Int. Cl.² .............................................. B60T 17/22
[52] U.S. Cl. ........................................ 73/121; 303/92; 340/52 B
[58] Field of Search ................ 73/2, 5, 121; 303/92; 340/52 B; 324/186

[56] References Cited

U.S. PATENT DOCUMENTS

| | | |
|---|---|---|
| 2,985,828 | 5/1961 | Mason ................................. 324/186 |
| 3,500,375 | 3/1970 | Klimo ............................... 324/186 X |
| 3,742,299 | 6/1973 | Gane ..................................... 324/186 |
| 3,874,743 | 4/1975 | Fleischer et al. ...................... 303/92 |
| 3,920,284 | 11/1975 | Lane et al. ............................ 303/92 |

*Primary Examiner*—Charles A. Ruehl
*Attorney, Agent, or Firm*—Flynn & Frishauf

[57] ABSTRACT

The time duration of output pulses from the transducer, including wave-shaping circuits, if used, is measured and compared with respect to predetermined time limits. Two sequential pulses are measured and stored. If both pulses are shorter than a predetermined time interval, no alarm signal is generated; if the first pulse is longer than a predetermined time interval and the second also longer than a predetermined time interval, an alarm signal generation circuit, otherwise activated by the second, longer signal, is inhibited (since acceleration or deceleration of the wheel is indicated); if, however, the time duration of the second sequential pulse is longer than a predetermined time interval, but the time duration of the preceding pulse is shorter than its time duration threshold value, the malfunction signal is not inhibited, indicative of malfunction, loose contacts, or the like.

7 Claims, 1 Drawing Figure

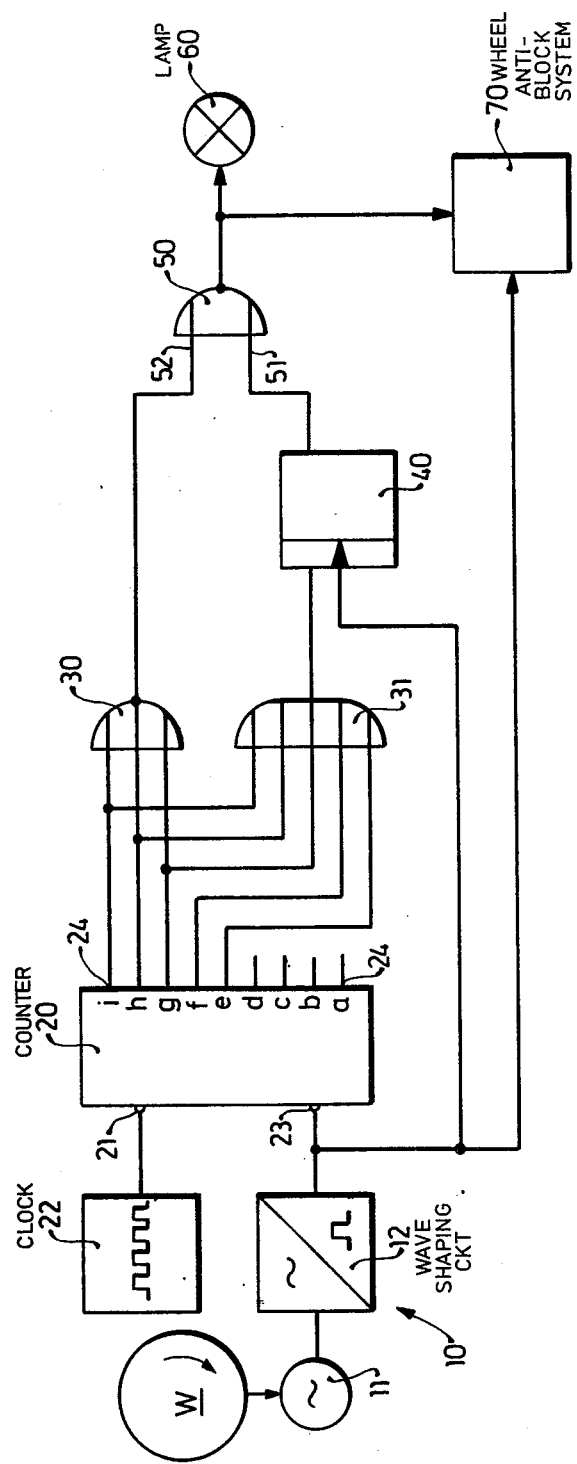

TESTING ROTARY MOVEMENT-ELECTRICAL SIGNAL TRANSDUCER SYSTEM, PARTICULARLY FOR VEHICLE WHEEL ANTI-BLOCK TRANSDUCER SYSTEMS

Cross reference to related U.S. Pat. Nos. 3,907,380; 3,874,743, 3,874,741, 3,822,920 and 3,866,980, all assigned to the assignee of the present application.

The present invention relates to testing of a signal transducer, and more particularly to the testing of rotary-electrical signal transducers for use in automatic wheel anti-block systems for automotive vehicles, and especially to methods and systems to carry out such tests.

Transducers used in automotive wheel anti-block systems provide pulses representative of rotation of the wheel. It is particularly important to supervise the proper function of the anti-block transducers continuously, and during operation. If one of the transducers should fail and provide an output signal which simulates blocking of a wheel — that is, no sequential pulses — then the usual anti-block system would vent the brake line to that particular wheel. Thus, the wheel cannot be braked if desired. A defect in the transducer, therefore, interferes with operating reliability of the vehicle.

It has previously been proposed to check the operation of the transducers by passing a test current therethrough. A test current was applied to one terminal of the transducer and the other terminal was connected to a check element which tested if the particular test current was present, or not. This system permits testing for an interruption in the transducer supply line as well to test the continuity of the transducer, but requires substantial equipment and components. Additionally, some malfunction effects cannot be checked by this method; for example, short circuits with a medium resistance short-circuiting junction, or other interferences in the supply lines to the transducers similar to short circuits are not checked by this method; intermittent or imperfectly-making contacts also cannot be tested thereby. Further, the system does not permit additional supervision of the wave-shaping stages usually associated with the transducers themselves.

It is an object of the present invention to provide a method and system to easily and simply check operability of the transducer system while recognizing as many malfunction effects as possible, and at least those usually encountered.

SUBJECT MATTER OF THE PRESENT INVENTION

Briefly, the period or pulse time of the pulses is measured; the sensed or measured value is compared with a reference time which has a limit with respect to its final time duration; upon exceeding this limit, the malfunction or evaluation signal is derived.

The invention proceeds from the basic concept that malfunction with respect to normal operation increases the pulse period of the pulses. In those applications in which the transducer should sense a region of speed range which is limited towards slow speed, the slowest possible speed which the transducer is to sense can be used as a reference value from which the longest period of time for the pulses, and hence the limiting value of the time period can be determined. If the pulse time of the pulse period is longer, an error evaluation or malfunction signal is derived. In this manner, shortcircuits, breaks in connecting lines, malfunction in the wave-shaping circuit, as well as intermittently operating contacts or connections can be sensed, if the interruptions due to the intermittent contacts or terminals result in pulses which are longer than the time period determined by the limiting time value.

Many wheel anti-block systems sense very slow wheel speeds, that is, wheel speeds of close to zero (wheel stopped). The last pulse, just before the wheel stops, will become quite long. A limiting time cannot be readily determined therefor. When applied to wheel anti-block systems, however, acceleration (and its negative, deceleration) is also sensed; thus, not only the extent of time of a pulse can be used to derive an evaluation signal; in accordance with a feature of the invention, the system is additionally so arranged that, during normal operation, a certain maximum acceleration (or, rather, deceleration) is determined. By use of change in length of pulses between sequential pulses, the time periods of the last pulses which arise before the wheel will stop can be determined, particularly by calculation. The limiting value is then selected to be longer than the time period of the next to the last pulse before the wheel has stopped. If the last wheel transducer pulse only is used as the basis to derive a malfunction signal, its time period can be longer than that so computed limiting value. Yet, the anti-block system may function properly with such a longer time period. Thus, that very last signal must be disabled from indicating a malfunction. In accordance with a feature of the invention, therefore, the pulse period not of only one pulse, but of succeeding pulses, for example two succeeding pulses, is measured. The time limit duration of the next to the last pulse is compared with a time limit duration which is shorter than the time limit duration for the last pulse. If this next to the last pulse has a time period which is longer than the second limit (which second limit, it must be remembered, represents a shorter time than the final limit), then a blocking signal is derived which inhibits further propagation of the error, or malfunction evaluation signal.

The second time period — also set with respect to longtime duration — is determined to be somewhat shorter than the duration of the period of the penultimate pulse, upon maximum deceleration of the wheel. Thus, the method and the system operating in accordance with this embodiment ensure that malfunction signals are not indicated if the time period of the penultimate pulse is longer than this second period. In other words, an evaluation signal is used to indicate malfunction if the sequences of periods of two preferably sequential transducer pulses fall in different time ranges beyond a time interval which is longer than the maximum possible change of periods of time in ordinary, normal operation.

In accordance with a feature of the invention, a system to carry out the method is provided which has a device to measure the time period of the transducer pulses by using a counter which is set by the flanks of the output signal from the transducer, a clock generator to provide a time base, and two decoding circuits connected to the output of the counter to derive, respectively, a malfunction signal and a malfunction output inhibiting signal. A memory is provided to store the malfunction inhibit signal, the output of the memory being connected to a logic gate to which the malfunction signal, as well as the inhibiting signal is applied to logically either propagate the malfunction signal, or not.

The system can readily be constructed in digital technology using a minimum of standard commercially available digital units; it can easily be integrated in existing digital wheel anti-block systems. Other constructions are possible, particularly those based on analog technology.

The invention will be described by way of example with reference to the accompanying drawings, wherein the single figure is a schematic block diagram of the system in accordance with the present invention, showing also the basis for the method.

A transducer system 10 includes a tachometer generator 11 which provides an a-c output voltage having a frequency proportional to speed of a vehicle wheel, indicated as W schematically only. A wave-shaping stage 12 is connected to the output of the transducer 11 and converts the output signal from the transducer to a square wave.

A counter 20 has two inputs; count input 21 connected to a clock pulse generator 22, and reset terminal 23 connected to the output of wave-shaping circuit 12. Counter 20 has a group of count stage outputs 24, numbered 24a to 24i.

The time period of the pulses derived from the wave-shaping circuit 12 are measured by using like flanks, for example the rising or leading flanks of each pulse from the wave-shaping circuit 12 to reset the counter 20, and counting the number of pulses derived from clock source 22 during a pulse period. The count state then will be proportional to the time period of the measured pulses.

The count state is available at the outputs 24 of the counter. The value of the count state increases from a to i. This output may be in binary-digital form and the binary-sequential or decimal decoding of the output of counter 20 is not shown separately, since this is a well-known logic process for which standard commercial items are available, already incorporated in counters. The outputs from the counter 20 are connected to two decoding elements 30, 31. The output signal from the decoding element 30 changes when the count state of the counter exceeds a predetermined value, namely when the output signal corresponding to count state g becomes a 1-signal. During ordinary operation, the counter will not reach the count state of g, and the output of decoding element 30, which is a NOR-gate, will have a 1-signal appear thereat. The output of decoding element 30 will change to a 0-signal only if the count state of counter 20 exceeds that of stage g. The presence of such a long signal might indicate malfunction; but could also be due to deceleration of a wheel just before stopping.

The output signal of decoding element 31 changes as soon as the count state of counter 20 exceeds a second, and shorter limit, which is shorter than the limiting value assigned to NOR-gate 30. Thus, element 31, which is an OR-gate, will provide a 1-signal when the output of counter 20 has a 1-signal at its e terminal. This 1-signal from the output of OR-gate 31 is used as a blocking, or inhibiting, or suppression signal, which is stored in a memory 40 formed as a flip-flop. It is stored for the duration of the period of the then existing pulse, and reset upon occurrence of the next subsequent pulse. Blocking gate 50 then will have appear at its input approximately simultaneously digital signals of which the one from input 51 is derived from the first occurring transducer pulse, and that at input 52 from the next subsequent transducer pulse. Blocking gate 50, which is a NOR-gate, will have a 1-signal appear at its output only if neither of the two inputs has a 1-signal thereon. This is the case only if the count state, upon measuring of the first occurring pulse, has not exceeded the time period assigned to the count of the counter to reach the stage e and, further, the count state of the next subsequent pulse has exceeded the time period assigned to the limiting duration of stage g. The output from gate 50 is then connected to a warning lamp 60 and can additionally be used to disconnected the wheel anti-block system 70, or to change over operation of the anti-block system to a different mode. This output signal from gate 50 is derived if, and only if, the time duration of the penultimate signal does not exceed a predetermined second time limit, whereas the time duration of the subsequent last signal being counted exceeds the longer predetermined time duration. The reset pulse to memory 40 can be derived, for example, from the trailing flank of the pulse wave-shaping circuit 12 so that the output from circuit 40 will be timed with the next subsequent pulse applied to its SET input.

Various changes and modifications may be made within the scope of the inventive concept.

We claim:

1. Method of testing a rotary movement — electrical signal transducer system providing pulses in synchronism with rotation of a rotary device having widely varying speeds, such as the wheel of an automotive vehicle, comprising the steps of
    measuring the time duration of two successive pulses;
    comparing the time duration of a first occurring pulse with a first predetermined time interval and having a first limited time duration with respect to a fixed longest time interval;
    generating a first evaluation signal if the measured time duration of the first pulse exceeds said first limited time duration;
    comparing the time duration of the second occurring pulse with a second predetermined time interval which is longer than said first predetermined time interval and having a second limited time duration with respect to said fixed longest time interval;
    generating a second evaluation signal and forming a preliminary error, or malfunction signal if the measured time duration of the second occurring pulse exceeds said second limited time duration;
    logically combining said first and second evaluation signals and
    (a) inhibiting generation of the preliminary error signal if
        the first pulse is shorter than the first interval, and the second pulse is shorter than the second interval;
    (b) inhibiting transmission of the preliminary error signal if
        the first pulse is longer than said first interval;
        the first pulse is longer than the first interval and the second pulse is also longer than said second interval, indicative of deceleration of the wheel; and
    (c) transmitting said preliminary error signal if the first pulse is shorter than said first predetermined interval and the second pulse is longer than said second predetermined time interval.
2. Method to test a vehicle wheel anti-block system wherein the rotary device is a vehicle wheel and rotary movement is rotation of the wheel, said method comprising the steps of claim 1.

3. Method according to claim 2, wherein the second predetermined time interval is longer than the signal period of the maximum permissible temporal change of the last pulse before stopping of the wheel;

and the first time interval is shorter than the signal period of the last pulse before stopping of the wheel.

4. Method according to claim 3, including the steps of continuously storing the time duration of pulses for the duration of the respective pulses until occurrence of the next subsequent pulse.

5. System to test a rotary movement — electrical signal transducer system providing pulses in synchronism with rotation of a rotary device having widely varying speeds, such as a wheel of an automotive vehicle comprising a counter (20), a clock generator (22) connected to step the counter in accordance with generation of the clock pulses;

first decoding means (31) and second decoding means (30), each decoding count outputs from the counter at discrete count stage positions;

a memory (40) connected to one of the decoding means (31);

and a blocking gate (50) having the output from the second of the decoding means (30) and from said memory (40) applied thereto and having an output providing an evaluation signal representative of the pulse lengths of successive pulses, one derived from the second of the decoding means (30) and the other from said memory (40), the transducer (10) of said transducer system providing input pulses to said counter to cause the counter to count, at the rate determined by the clock (22) upon first occurrence of any one pulse, the first decoding means (31) being connected to the counter to decode counting to lower numbered count stages (e, f), said second decoding means (30) providing an output to the blocking gate (50) from a count stage which is higher, and thus representative of a time interval which is longer than time interval decoded by said first decoding means (31) whereby the memory (40) will store a signal representative of the time duration of the first of two successively occurring pulses, the blocking gate (50) inhibiting generation of an output signal derived from said second decoding means (30) if said first decoding means (31) has decoded the preceding signal to have a longer time duration than said first time interval required for the counter (20) to reach the count stage at which said first decoding means (31) responds, but transmitting an output signal from the second decoding means (30) indicative of the second pulse being in excess of the time interval for the counter to reach the count stage at which the second decoding means (30) responds if said first decoding means (31) has decoded the preceding signal to have a shorter time duration than the time interval required for the counter (20) to reach the count stage at which said first decoding means (31) responds.

6. Vehicle wheel anti-block system, including the testing system claimed in claim 5, wherein said device comprises a vehicle wheel and the rotary movement is rotation of the wheel.

7. System to test a rotary movement — electrical signal transducer (10,11,12) for an automotive vehicle wheel (W) in a brake anti-block system (70) providing a train of successive pulses upon rotation of the wheel comprising a counter (20), a clock generator (22) connected to the counter and causing stepping of the counter to thereby provide predetermined time intervals;

two decoding means (30, 31) connected to the output of the counter (20) to derive a malfunction signal and an inhibit signal, respectively, the malfunction signal decoding means (30) being connected to a higher count stage of the counter than the inhibit signal decoding means (31), whereby the malfunction signal decoding means will determine a longer time interval than the inhibit signal decoding means;

a blocking gate (50) and an evaluation output signal processing means (60, 70) connected to the blocking gate (50);

a memory (40) connected to the output of the inhibit decoding means (31) and storing the output signal from the inhibit decoding means (31) until a next subsequent pulse from the transducer (10, 11, 12), the output of the memory (40) being connected to the blocking gate (50), the blocking gate further having the output from the malfunction decoding means (30) applied thereto to provide an indication to the evaluation means (60, 70) if:

(a) a pulse from the transducer (10, 11, 12) subsequent to a preceding prior pulse therefrom has a longer time duration than the time interval necessary for the counter to count to the count stage at which the malfunction logic means (30) will respond, and (b) the preceding pulse, as stored in the memory (40), has a time duration which is shorter than the time duration taken by the counter (20) to count to the count stage at which the inhibit logic means (31) will respond to inhibit an output from the blocking gate unless two subsequently occurring pulses each have respective pulse time durations which are both longer than the respective time intervals determined by the respective inhibit signal decoding means (31) and by the malfunction signal decoding means (30).

* * * * *